United States Patent [19]
Covington et al.

[11] Patent Number: 6,027,640
[45] Date of Patent: Feb. 22, 2000

[54] ANTI-DRAIN BACK/PRESSURE RELIEVED FILTER CARTRIDGES

[75] Inventors: Edward A. Covington; Gerald Rowland, both of Gastonia, N.C.

[73] Assignee: Dana Corporation, Toledo, Ohio

[21] Appl. No.: 09/040,422

[22] Filed: Mar. 18, 1998

Related U.S. Application Data

[63] Continuation-in-part of application No. 08/741,968, Oct. 31, 1996, which is a continuation-in-part of application No. 08/653,715, May 23, 1996, Pat. No. 5,833,843, which is a continuation-in-part of application No. 08/556,595, Nov. 13, 1995, Pat. No. 5,690,816.

[51] Int. Cl.$^7$ .................. B01D 35/147; B01D 35/153
[52] U.S. Cl. .................. 210/130; 210/136; 210/429; 210/440
[58] Field of Search .................. 210/130, 136, 210/429, 430, 440, 149; 137/853

[56] References Cited

U.S. PATENT DOCUMENTS

| | | | |
|---|---|---|---|
| 2,092,162 | 9/1937 | Humbert, Jr. et al. | 210/438 |
| 2,183,616 | 12/1939 | Korte | 210/165 |
| 2,937,756 | 5/1960 | Humbert, Jr. | 210/444 |
| 3,132,097 | 5/1964 | Tietz | 210/130 |
| 3,231,089 | 1/1966 | Thornton | 210/130 |
| 3,235,085 | 2/1966 | Humbert, Jr. | 210/130 |
| 3,243,045 | 3/1966 | Tietz | 210/130 |
| 3,305,095 | 2/1967 | Hathaway | 210/130 |
| 3,332,554 | 7/1967 | Humbert, Jr. | 210/130 |
| 3,384,113 | 5/1968 | Pennisi | 137/853 |
| 3,529,722 | 9/1970 | Humbert, Jr. | 210/130 |
| 3,557,957 | 1/1971 | Baldwin | 210/130 |
| 3,567,023 | 3/1971 | Buckman et al. | 210/130 |
| 3,785,491 | 1/1974 | Dudinec et al. | 210/130 |
| 4,144,168 | 3/1979 | Thornton | 210/130 |
| 4,732,678 | 3/1988 | Humbert, Jr. | 210/440 |
| 4,872,976 | 10/1989 | Cudaback | 210/130 |
| 5,284,579 | 2/1994 | Covington | 210/130 |
| 5,405,527 | 4/1995 | Covington | 210/130 |
| 5,679,244 | 10/1997 | Tettman et al. | 210/130 |
| 5,690,816 | 11/1997 | Covington | 210/130 |
| 5,833,843 | 11/1998 | Covington | 210/130 |

FOREIGN PATENT DOCUMENTS

| | | |
|---|---|---|
| 722021 | 11/1965 | Canada. |
| 1 525 689 | 9/1978 | United Kingdom. |

Primary Examiner—Matthew O. Savage
Attorney, Agent, or Firm—Millen, White, Zelano & Branigan

[57] ABSTRACT

A filter including a combination bypass valve and anti-drain valve is disclosed herein. The filter includes an annular valve support which supports an annular valve member disposed between the support and a filter cartridge. The valve support has an inner sleeve portion which seats against an end plate and an outer sleeve portion including bypass louvers therethrough. The valve member has an expandable collar portion which normally seals the bypass louvers and a skirt portion which normally seals inlet openings extending through the end plate. The skirt permits flow through the inlet openings into the filter but prevents out of the filter through the inlet openings. Excessive pressure caused by a clogged filter element deflects the expandable collar away from the bypass louvers thereby permitting flow to bypass the filter element.

12 Claims, 4 Drawing Sheets

ANTI-DRAIN BACK/PRESSURE RELIEVED FILTER CARTRIDGES

RELATED PATENT APPLICATIONS

This application is a continuation-in-part of U.S. patent application Ser. No. 08/741,968, filed Oct. 31, 1996, pending, which is a continuation-in-part of U.S. patent application Ser. No. 08/653,715, filed May 23, 1996, now U.S. Pat. No. 5,833,843, which is a continuation-in-part of Ser. No. 08/556,595, filed Nov. 13, 1995, now U.S. Pat. No. 5,690,816.

FIELD OF THE INVENTION

The present invention relates to improvements in anti-drain back, pressure relieved, filter cartridges. More particularly, the present invention relates to improvements in valve configurations for such filter cartridges and in improvements in configurations for retaining annular filter elements and valve components within filter cartridges.

BACKGROUND OF THE INVENTION

Annular filter elements are mounted in filter housings to form replaceable filter cartridges which are threadably mounted on internal combustion engines. These cartridges are known as "spin-on filters" because they are threadably mounted and removable. If a customer follows the recommended procedures for changing the filter cartridge when lubricating oil is changed, then it is unusual for the filter to clog; however, if the customer fails to change the filter cartridge, or if the lubricating oil becomes contaminated for some other reason, the filter can become clogged or otherwise blocked as to minimize flow of lubricating oil to the engine. If this happens, an engine can be destroyed or seriously damaged.

In order to avoid or at least minimize damage, filter cartridges have been configured to allow oil to bypass filter elements in the cartridges when the filter elements become clogged. The engine is thereafter supplied with at least unfiltered lubricant rather than no lubricant at all, or insufficient lubricant. It is also desirable to keep oil within the filter cartridge when the engine is not running so that when the engine is started, there is no substantial gap in the flow of lubricating oil caused by a slight delay as the filter cartridge refills with oil. This is accomplished by providing an anti-drain back valve which closes when not subjected to pressure from the engine's oil pump so as to prevent draining of oil from the filter back toward the crank case.

Millions of filter cartridges are manufactured every year and millions are disposed of. Since these filter cartridges are disposable, reduction in their cost is highly desirable. One cost reduction approach is to reduce the number of parts and to simplify assembly. Heretofore this has been difficult to accomplish without compromising the effectiveness of the filter cartridges.

In cold environments, lower temperatures of lubricating oil and mechanical components result in higher oil pump pressure and increased filter resistance to flow due to higher lubricating oil viscosity. Current oil filters do not have by-pass valves which accommodate both high operating temperatures after warm up and low temperature, cold startups which are now designed to occur at higher valve opening pressures of 11–14 psi rather than 8–11 psi. The complexity of the situation is further increased because it is desirable after warm-up, that the opening pressure of the bypass valve return to 8–11 psi.

SUMMARY OF THE INVENTION

It is a feature of the present invention to provide a new and improved configuration for anti-drain back/pressure relieved filter cartridges which has an additional advantage that it will not starve an engine for lubricating oil at high temperatures while compensating for cold flow lubrication.

In accordance with the present invention, a bypass valve is disposed between intake and an outlet of a lubricating oil filter cartridge which allows oil to bypass a filter media if the filter media becomes clogged. The bypass valve opens at a higher pressure when the lubricating oil is cold than when it is warm or at operating temperature.

In another aspect of the present invention, a lubricating oil filter cartridge includes a housing with an annular filter element therein and an end plate, the end plate having inlet openings therethrough for allowing unfiltered lubricating oil to enter the housing and a central outlet for allowing filtered oil to pass out of the filter housing. In accordance with the present invention, the improvement comprises an annular valve support disposed between the end plate and the filter element, the annular valve element having an inner sleeve bearing against the end plate proximate the outlet and an outer sleeve with a plurality of louvers therethrough for allowing lubricating oil to bypass the filter element when the louvers are uncovered by an annular valve member. In order to support the annular filter element, the annular valve support further has a radially extending flange which underlies the annular filter element. The annular valve member has a flexible shirt which functions as an anti-drain back valve and an expandable collar fitting around the outer sleeve of the annular valve support to function as a bypass valve. In order to function as a bypass valve, the expandable collar normally covers the louvers but spreads to uncover the louvers when the filter element becomes clogged. Consequently, unfiltered lubricating oil normally passes through the annular filter element, but when the filter element becomes clogged, bypasses the annular filter element and flows through the louvers in the annular filter support.

In a further aspect of the invention, the annular valve member is disposed between the annular filter element and the outer sleeve of the annular valve support with the radially extending flap disposed between the radially extending flange of the annular valve support and the filter element.

In still a further aspect of the invention, the annular valve support is made of metal which may, for example, be steel.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

1) First Embodiment—FIGS. 1–9

Figure 1:
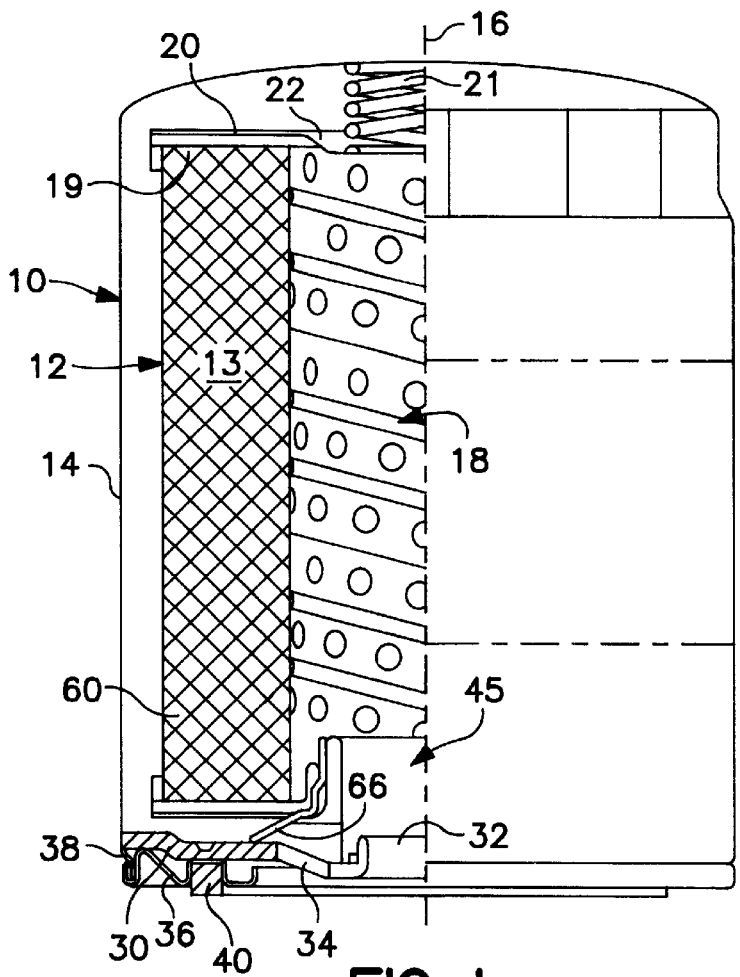
FIG. 1 is a side view, partially in section, of a first embodiment of an anti-drain back/pressure relieved filter cartridge configured in accordance with the principles of the present invention, showing the filter cartridge in an anti-drain back mode when the filter is connected to an engine which is not running.

Referring now to FIG. 1, there is shown a lubricating oil filter cartridge 10 configured in accordance with the present invention, wherein the cartridge comprises an annular filter element 12 configured of a conventional pleated paper filament media 13, or some other filter material, contained within a cylindrical housing 14. The annular filter element 12 is concentric with respect to an axis 16 of the cartridge 10 and has a hollow core 18. In FIG. 1, the filter cartridge 10 is shown in the normal operating mode where the oil passes through the filter media 13. The annular filter element 12 has a first end 19 configured as a closed, dished end cap 20 which is abutted by a spring 21 that is seated in a depression 22 within the closed, dished end cap.

Figure 2:
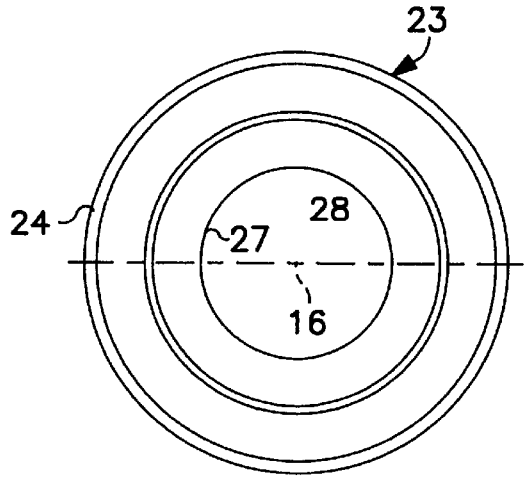
FIG. 2 is an end view of a bottom end cap used with a filter element supported in the filter cartridge of FIG. 1.
Figure 3:
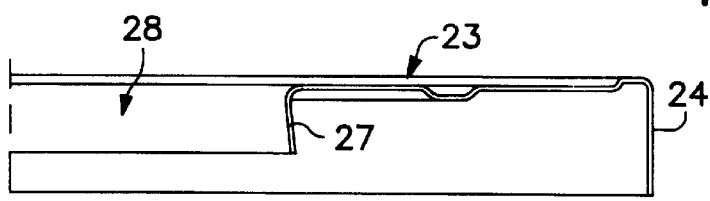
FIG. 3 is an enlarged side elevation of the end cap of FIG. 2 taken along lines 3—3 of FIG. 2.

Referring now to FIGS. 2 and 3 in combination with FIG. 1, at the second end of the annular filter element 12, there is an annular end cap 23 having an outer axial flange 24 and an inner axial flange 27 surrounding a central opening 28. The inner axial flange 27 is aligned with the hollow core 18 of the filter element and is bent away from or angled inwardly from the axis 16 slightly. The inner and outer axial flanges are connected to one another via a radially extending plate 29 which has an annular stiffening offset therein. As will be explained hereinafter, the flange 27 by being angled inwardly away from the axis 16 avoids nicking the valve member.

Referring again to FIG. 1, an end plate 30 encloses the filter element 12 in the housing 14. The end plate 30 includes a threaded outlet 32, coaxial with the axis 16 of the filter cartridge 10 and a plurality of inlet openings 34 (only one of which is shown) are disposed in spaced relation with one another around the axis 16 of the cartridge 10. The end cap 30 is held proximate the end of the housing by a cover 36 which is crimped to the bottom end of the housing 14 by a peripheral crimp 38. An annular seal 40 seals the inlet openings 34 with respect to the environment surrounding the filter cartridge 10.

Figure 4:
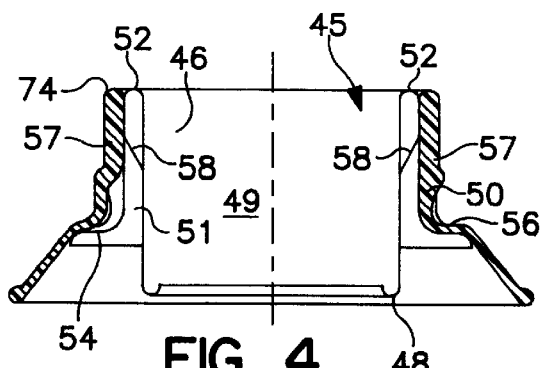
FIG. 4 is a side view of a combination valve member and filter element support.
Figure 5:
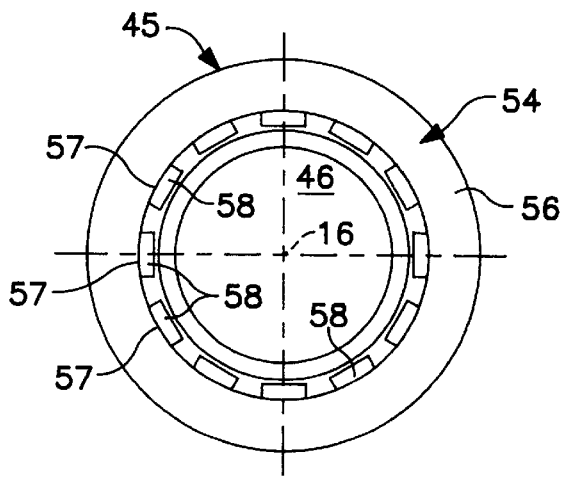
FIG. 5 is an end view of the support of FIG. 4.
Figure 6:
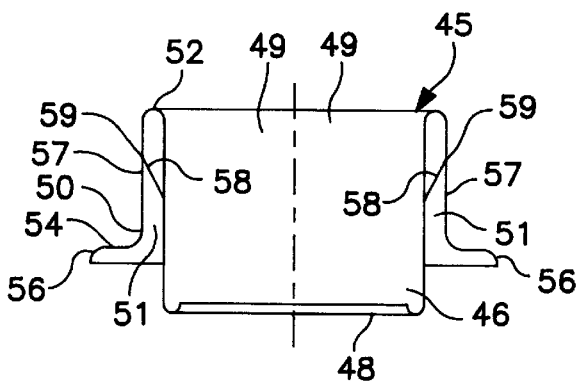
FIG. 6 is a side elevation of the support of FIGS. 4 and 5.

Referring now mainly to FIGS. 4–6 in combination with FIG. 1, there is shown a combination valve member and filter element support 45 preferably made of metal. The support 45 has an inner sleeve 46 with an annular rolled stiffener 48 which defines a channel 49 and an outer sleeve 50 separated by space 51 from the inner sleeve, the outer sleeve being connected to the inner sleeve by an annular, arcuate bight 52. The outer sleeve 50 has a radial flange 54 extending outwardly therefrom, the radial flange terminating in an upper convex surface 56. The outer sleeve 50 has a plurality of axially extending openings 57 therethrough, each opening being defined by a louver 58 bent at 59 away from a first axial end of the opening in the outer sleeve 50 toward the inner sleeve 46.

Referring now to FIG. 1 in combination with FIGS. 4–6, it is seen that the filter and valve member support 45 is seated against the end plate 30 co-axially with the internally threaded outlet 32. The rolled end stiffener 48 forms an annular foot surrounding the outlet 32. As will be explained in more detail hereinafter, the inner and outer sleeves 46 and 50 of the support 45 are received within the central opening 28 of the end cap 23 shown in FIGS. 2 and 3. The end cap 23 also overlies the radial flange 54 of the combined valve member and filter element support 45.

Figure 7:
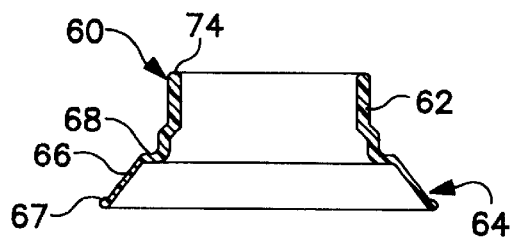
FIG. 7 is a side elevation of an annular valve member incorporating the features of the present invention which is supported by the annular filter element and valve member support of FIGS. 4–6.
Figure 8:
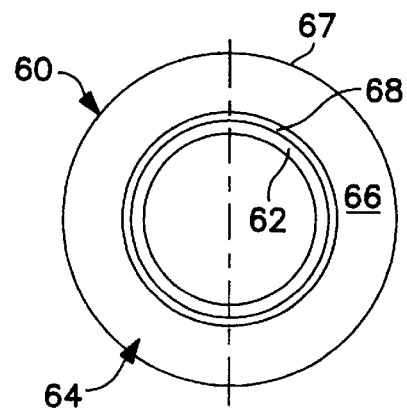
FIG. 8 is an end view of the valve member of FIG. 7.
Figure 9:
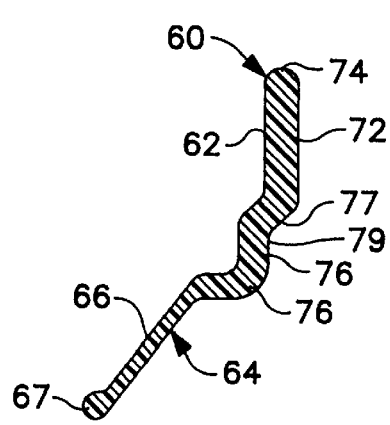
FIG. 9 is an enlarged view of a cross-section of the valve member of FIGS. 7 and 8.

Referring now mainly to FIGS. 7–9, there is shown a valve member 60 which is comprised of an expandable collar portion 62 and a skirt portion 64. The collar 62 is preferably made of a material such as Jasper 4229 silicone which is a rubber material available from the Jasper Rubber Company. The skirt 64 has a frustoconical portion 66 which has a periphery 67 and a generally radial portion 68 that joins the frustoconical section to the expandable collar portion 62.

The expandable collar portion 62 has a first portion 72 with a free annular end 74 and a second portion 76 which is joined to the first portion by a first curved section 77 and to the radial portion 68 by a second curved section 78. Consequently, the second annular portion 76 is radially offset with respect to the first annular portion 72 to create a radial space 79. The curved sections 77 and 78 of the collar 62 are thickened sufficiently to minimize axial stretch in the direction of axis 16. Accordingly, the collar portion 62 is about twice as thick as the skirt portion 66, the collar being about 0.060 inch and the skirt about 0.030 inch.

Figure 10:
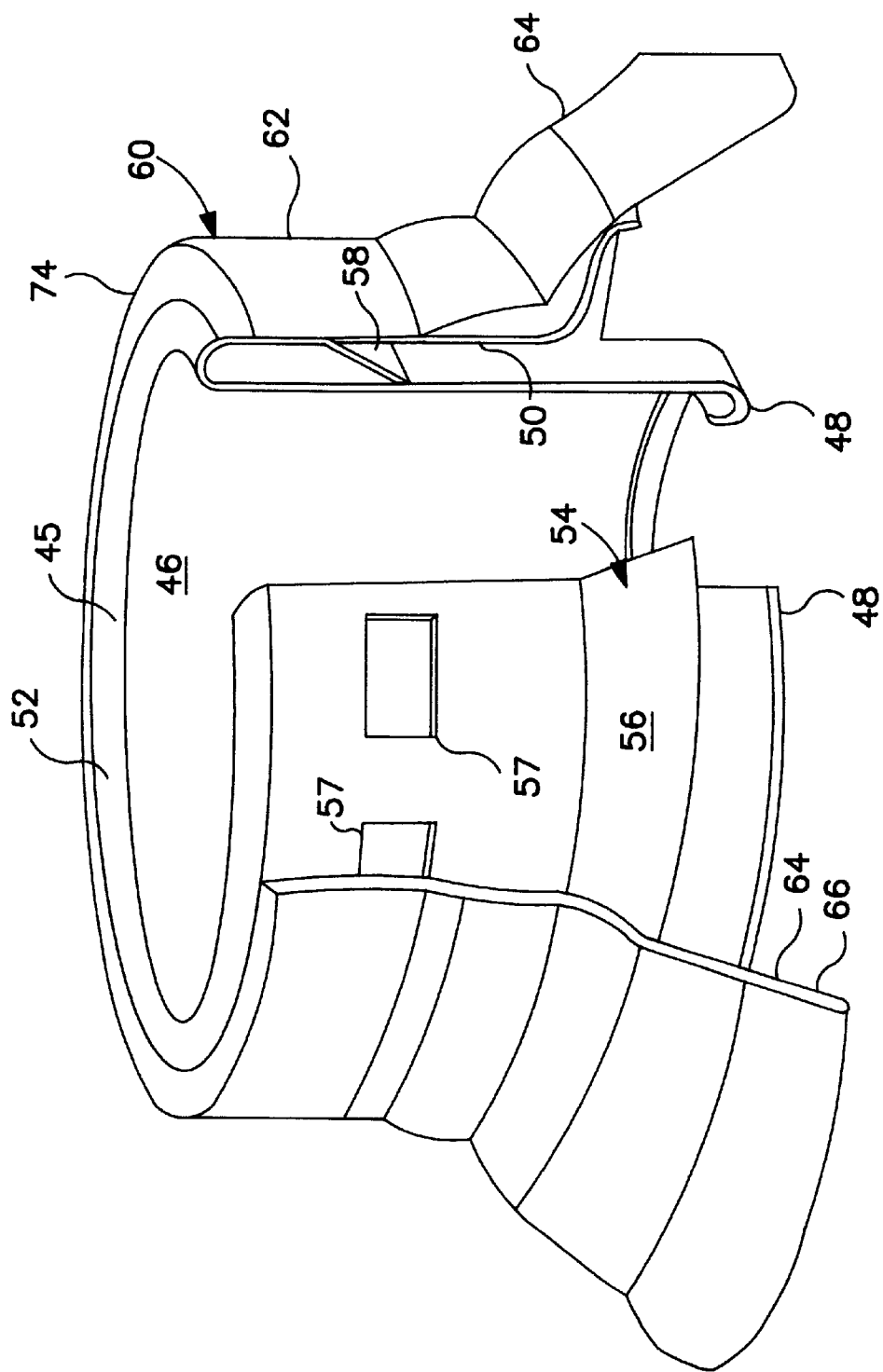
FIG. 10 is an enlarged perspective view, partially in section, showing a valve member and filter element support mounting a valve member.
Figure 12:
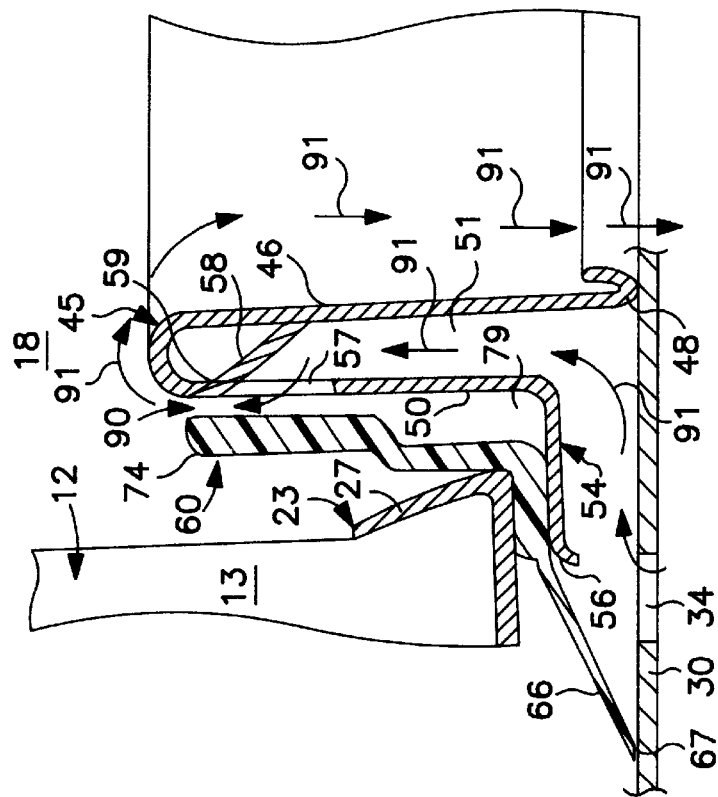
FIG. 12 is a view similar to FIG. 11 but showing the valve in a bypass mode.
Figure 11:
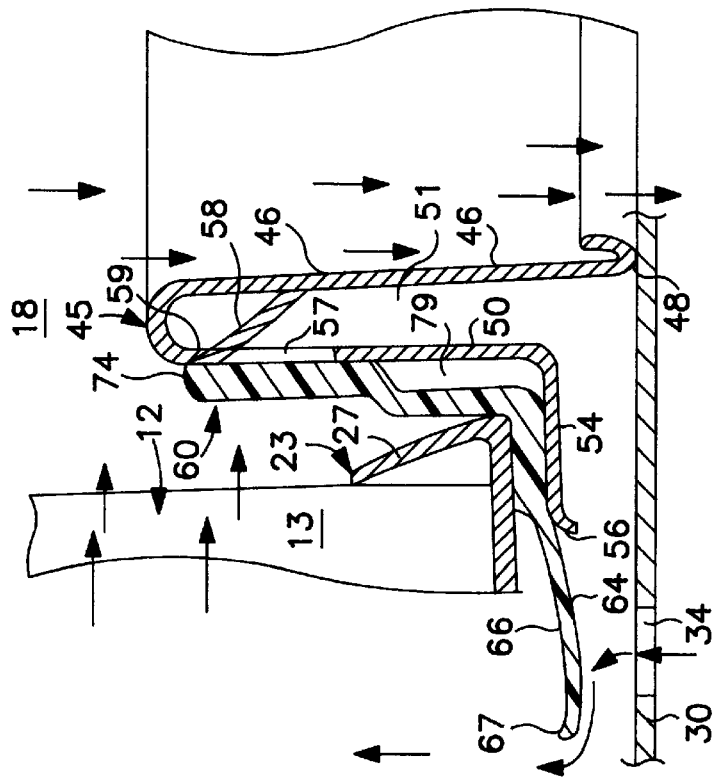
FIG. 11 is an enlarged elevational view of an assembly comprising a portion of a filter element mounted on the valve and the support, showing the valve in a standard mode.

As is seen in FIG. 10–12, the valve member 60 of FIGS. 7–9 fits over the combined valve member and filter element support 45 of FIGS. 4–6. The annular end cap 23 of the filter element 12 is urged against the radial portion 68 of the valve 60 by the coil spring 21 (see FIG. 1). As is best seen in FIGS. 11 and 12, the inner axial flange 27 of the end cap 23 is bent away from the collar 62 to avoid nicking the collar when the filter canister 10 is in the bypass mode. The frustoconical portion 66 of the skirt 64 drapes over the upper convex surface 56 of the radial flange 54 with the peripheral end 67 of the skirt resting on the end plate 30. The edge of the radial flange 54 is displaced away from the skirt 64 so that the sharp edge of the flange does not damage the skirt.

Normally, when the engine (not shown) to which the canister 10 is connected is not operating (see FIG. 1), lubricating oil in the canister is retained in the canister by the skirt 64 because the frustoconical portion 66 of the skirt prevents lubricating oil from flowing out of the inlet holes 34. Accordingly, the skirt 64 fictions as an anti-drain back valve.

As is seen in FIG. 1 and FIG. 11, when the engine is running, the frustoconical portion 66 of the skirt 64 deflects upwardly, allowing lubricating oil to flow in the direction of the arrows 85, wherein the lubricating oil flows around the outside of the filter element 12 and is forced radially therethrough into the hollow core 18 of the filter element, from which it then flows through the internally threaded outlet 32 and out of the filter cartridge 10.

When the filter element 12 becomes clogged, then the oil cannot follow the path of the arrows 85, because the oil cannot pass through the filter media 13 comprising the filter element 12. This forces the oil to apply pressure in the annular space 53 between the inner sleeve 46 and outer sleeve 50. Pressure in the space 53 is also applied through the series of openings 57 to the expandable collar 62 as liquid flows over the louver 58 toward the free end 74 of the collar 60.

As is seen in FIG. 1 and FIG. 12, when the pressure exceeds a predetermined pressure due to the clogging of the filter media 13, there is a radial expansion of the collar 62, as well as a slight axial elongation, which creates a gap 90 that allows the lubricating oil to pass between the outer sleeve 62 and the collar 60 in the direction of dotted line arrows 91, thus not flowing through the filter media 13. The lubricating oil thus passes into the hollow core 18 of the filter element 12, through the channel 49 defined in the support 45, and out of the filter cartridge 10 via the threaded outlet 32.

While a lubricating oil following the direction of the arrows 90 is unfiltered, it still provides lubricant to the associated engine. This is of course preferable to the engine receiving no lubricant at all due to the filter element 12 being clogged. When the engine is stopped, the upper portion 76 of the expandable collar 62 retracts to its normal position of FIG. 1, sealing louvers 58 to prevent oil from draining from the filter cartridge 10.

The annular valve member 60 is molded of low swell, silicon elastomer, such as Jasper 4229 silicone, available from the Jasper Rubber Company of Jasper, Ind., which is silicone compression molded. By molding the annular valve members 60 of low swell silicone materials, such as Jasper 4229 silicone, and properly configuring the collar portion 62, the valve members compensate for cold flow filtration while not starving an engine for oil at high temperatures when the filter medium becomes clogged. Further to this point, original equipment engine manufacturers are raising opening pressures of bypass valves for filters which filter lubricating oil. This is due to higher flow rates of unfiltered oil during cold starts. During normal operating temperatures, the opening pressure is in the range of about 8–10 psi, but for cold starts, new design parameters specify opening pressures in the range of about 11–14 psi. The annular valve member 60 accommodates this situation by utilizing low swell silicone which increases in elasticity as the temperature rises.

In cold environments, low temperatures of lubricating oil and mechanical components increases oil viscosity, resulting in oil pumps producing higher pressures. The silicone elastomer of the valve members 110 and 203 increases in elastic modulus and temperature strength as temperatures drop, resulting in higher opening pressures of, for example, 11–14 psi at temperatures of, for example, −30° F. and lower opening pressures at engine operating temperatures of 180° F. Typically, this standard opening pressure at 180° F. of a warmed up engine is in the range of 8–10 psi. By utilizing the second embodiment of the invention, when a filter media 12 becomes clogged, bypass of the filter media is effective over a wide temperature range to minimize engine damage due to uncirculated lubricant.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a lubricating oil filter cartridge, a housing with an annular filter element therein; the annular filter element having a hollow core, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve bearing against the end plate proximate the outlet and an outer sleeve spaced from the inner sleeve to define an annular space therebetween, the outer sleeve including a plurality of openings therethrough communicating with the annular space and including louvers adjacent to the openings, the louvers extending into the annular space and directing the lubricating oil to flow through the openings, the outer sleeve having a radially extending flange extending outwardly therefrom for supporting the annular filter element; and an annular valve member having a radially extending skirt overlying the inlet openings in the end plate, the radially extending skirt functioning as an anti-drain back valve by preventing oil from flowing out of the filter through the inlet openings while allowing oil under pressure to deflect the flaps and to flow pass the annular valve member and through the annular filter element when the annular filter element is not clogged, the valve member further including an expandable collar fitting around the outer sleeve and covering the openings, the expandable collar spreading to uncover the openings as the liquid flows over the louvers and between the collar and the outer sleeve when the filter element becomes clogged so as to bypass the clogged filter.

2. The improvement of claim 1, wherein the annular valve member is disposed between the filter element and the outer sleeve of the valve support.

3. The improvement of claim 2, wherein the filter element has an end cap with an inner axially extending flange, the inner axially extending flange of the end cap engaging the expandable collar.

4. The improvement of claim 1, wherein the expandable collar is cylindrical and has an end which terminates outside of the outer sleeve.

5. The improvement of claim 4, wherein the valve member is made of a resilient resinous material.

6. The improvement of claim 5, wherein the valve member is made of silicone.

7. The improvement of claim 6, wherein the annular valve support is made of steel or plastic.

8. The improvement of claim 1, wherein the valve member is configured and arranged for opening at a selected pressure indicative of the filter media being clogged, the selected pressure being higher at low temperatures than at operating temperature.

9. The improvement of claim 8, wherein the valve member comprises a temperature sensitive elastic material having an elastic modulus which increases as temperature drops.

10. The improvement of claim 9, wherein the material is silicone.

11. The improvement of claim 1, wherein the expandable collar has a free end disposed beyond the openings and wherein the louvers extend from the annular space toward the annular free end to direct the liquid toward the free end.

12. The improvement of claim 11, wherein the openings extending axially with respect to the annular valve support and have a first end and a second end, the first end being adjacent to the annular free end of the collar and having a single louver extending therefrom toward the inner sleeve.

* * * * *